Patented Feb. 25, 1936

2,031,681

UNITED STATES PATENT OFFICE 2,031,681

MANUFACTURE OF CALCIUM CHLORITE

George Paul Vincent, Niagara Falls, N. Y., assignor to The Mathieson Alkali Works, Inc., New York, N. Y., a corporation of Virginia No Drawing. Application May 3, 1935, Serial No. 19,657

6 Claims. (Cl. 23—85)

My invention relates to improvements in the manufacture of calcium chlorite. More particularly, my invention relates to improvements in the separation of calcium chlorite, $Ca(ClO_2)_2$, from calcium chlorate, $Ca(ClO_3)_2$, when these two salts are concurrently produced by reaction between chlorine dioxide and calcium hydroxide.

When chlorine dioxide is absorbed in an aqueous slurry of calcium hydroxide, calcium chlorite and calcium chlorate are formed in equal molecular proportions as follows:

$$4ClO_2 + 2Ca(OH)_2 \rightarrow Ca(ClO_2)_2 + Ca(ClO_3)_2 + 2H_2O$$

I have found that substantially complete separation of the calcium chlorite from the calcium chlorate produced in this reaction can be accomplished by adding calcium chlorate, or better calcium chlorate and sodium chloride, NaCl, or calcium chloride, $CaCl_2$, to the aqueous slurry of calcium hydroxide in which the chlorine dioxide is absorbed. By properly proportioning the additions of calcium chlorate, or of calcium chlorate and sodium chloride or calcium chloride, the bulk of the calcium chlorite formed can be precipitated from the slurry and thus separated from the calcium chlorate formed, the calcium chlorate remaining in solution in the slurry. Any unreacted calcium hydroxide separated from the slurry with the calcium chlorite so precipitated is easily eliminated from the calcium chlorite product by recrystallization.

In order to avoid contamination of the precipitated calcium chlorite with calcium chlorate, the precipitated calcium chlorite is separated from the slurry before the concentration of calcium chlorate reaches the point at which precipitation of calcium chlorate begins. The same precaution is observed when calcium chloride, in moderate proportion, is used in conjunction with calcium chlorate, calcium chloride being less soluble in such slurries than calcium chlorate. When sodium chloride is used in conjunction with calcium chlorate, the precipitated calcium chlorite is separated from the slurry before it becomes saturated with respect to either calcium chlorate or sodium chloride, that is before the precipitation of calcium chlorate begins and before the precipitation of sodium chlorate begins. Also, as the slurry approaches saturation with respect to calcium chlorate, the velocity of the reaction forming calcium chlorite and calcium chlorate diminishes rapidly, making it advantageous to work at concentrations below saturation with respect to calcium chlorate to obtain effective reaction velocities as well as to avoid contamination of the precipitated calcium chlorite with calcium chlorate. Maximum recoveries of calcium chlorite are obtained when the initial concentration of the calcium chlorate in the slurry in which chlorine dioxide is absorbed exceeds about one-fourth of the saturation concentration, but lower initial concentrations of calcium chlorate are useful since the formation of calcium chlorate accompanying the formation of calcium chlorite tends to increase this concentration.

The operation can be made cyclic, with respect to the absorption medium, by the addition of water and calcium hydroxide to the slurry remaining after separation of precipitated calcium chlorite and by elimination of calcium chlorate from the recycled absorption medium in amount, per cycle, equivalent, for example, to that formed per cycle. Such elimination of calcium chlorate is necessary to maintain the cycle in balance. This elimination of calcium chlorate can be effected in several ways. It can be effected, with advantage, by diluting and adding calcium hydroxide to part of the slurry from which calcium chlorite has been separated to form additional quantities of slurry for absorbing chlorine dioxide while relieving the operation of another part of this slurry. It can also be effected, with advantage, by precipitating calcium chlorate from the slurry from which calcium chlorite has been separated by concentration of this slurry, by separating the precipitated calcium chlorate from the concentrated slurry and by diluting and adding calcium hydroxide to the concentrated slurry to form additional quantities of slurry for absorbing chlorine dioxide.

While the relative solubilities involved vary somewhat with varying temperatures, the solubility of calcium chlorite in aqueous solutions of calcium chlorate and in aqueous solutions of calcium chlorate and sodium chloride at 25° C. will illustrate the orders of recoveries to be had by practicing my invention. In a solution consisting of 52 grams $Ca(ClO_3)_2$ in 100 cubic centimeters of water at 25° C., the solubility of calcium chlorite, $Ca(ClO_2)_2$, is limited to about 4.3 grams. In a solution consisting of 52 grams $Ca(ClO_3)_2$ in 100 cubic centimeters of water at 25° C. and saturated with respect to NaCl, the solubility of calcium chlorite, $Ca(ClO_2)_2$ is limited to about 1.45 grams.

My invention will be further illustrated by the following examples of embodiments of my invention:

*Example 1.*—A total of 18.3 parts (by weight)

of $Ca(OH)_2$ is progressively added to a solution of 52 parts of $Ca(ClO_3)_2$ in 100 parts of water. A total of 33.25 parts of $ClO_2$ is absorbed in this slurry during the progressive addition of $Ca(OH)_2$. 21.58 parts of calcium chlorite, $Ca(ClO_2)_2$, are formed by the reaction and, at 25° C., about 18.9 parts of this calcium chlorite are precipitated and separated from the slurry. After separation of the precipitated calcium chlorite, the slurry is diluted with 45.2 parts of water, reducing the concentration of calcium chlorate from about 743 grams per liter of water to about 520 grams per liter of water. The operation first described is repeated using about 152 parts of this diluted slurry as the medium to which the calcium hydroxide is added and in which the chlorine dioxide is absorbed. The amount of water used to dilute the slurry in cyclic operation of the process may vary somewhat from that stated above. In the example the theoretical amount of water required to make the desired slurry has been given but in actual practice the amount of water required will be slightly more depending, in each case, on the amount removed with the calcium chlorite.

*Example 2.*—6.25 parts (by weight) of $Ca(OH)_2$ are suspended in a solution of 43 parts of $Ca(ClO_3)_2$ and 24 parts of NaCl in 100 parts of water, and 11.4 parts of $ClO_2$ are absorbed in this slurry. 7.4 parts of calcium chlorite, $Ca(ClO_2)_2$, are formed by the reaction, and, at 25° C., about 6 parts of this calcium chlorite are precipitated and separated from the slurry. After separation of the precipitated calcium chlorite, the slurry is diluted with 18.7 parts of water, reducing the concentration of calcium chlorate from about 517.5 grams per liter of water to about 430 grams per liter of water. 4.06 parts of NaCl are added to about 163 parts of the diluted slurry to form the medium in which calcium hydroxide is suspended and in which chlorine dioxide is absorbed in a repetition of the operation first described. The amounts of water and NaCl added to the slurry to make the process cyclic may vary somewhat from that stated above. As in Example 1, the theoretical amounts required to prepare the desired slurry have been given but in actual practice the amounts required will be slightly greater depending, in each case, on the amounts removed with the calcium chlorite.

Calcium chloride, $CaCl_2$, may be substituted for sodium chloride in the second of the foregoing examples.

The operation described in each of the foregoing examples produces a calcium chlorate liquor, in excess of that recycled in the operation, as well as calcium chlorite. This excess calcium chlorate liquor may be used, for example, in the production of chlorine dioxide gas for carrying out the operation.

I claim:

1. In the manufacture of calcium chlorite, the improvement which comprises absorbing chlorine dioxide in an aqueous slurry of calcium hydroxide containing calcium chlorate in proportion less than sufficient to saturate the slurry until calcium chlorite precipitates and separating the precipitated calcium chlorite from the slurry before precipitation of calcium chlorate begins.

2. In the manufacture of calcium chlorite, the improvement which comprises absorbing chlorine dioxide in an aqueous slurry of calcium hydroxide containing calcium chlorate and calcium chloride in proportions less than sufficient to saturate the slurry until calcium chlorite precipitates and separating the precipitated calcium chlorite from the slurry before precipitation of calcium chlorate begins.

3. In the manufacture of calcium chlorite, the improvement which comprises absorbing chlorine dioxide in an aqueous slurry of calcium hydroxide containing calcium chlorate and sodium chloride in proportions less than sufficient to saturate the slurry with respect to calcium and sodium chlorates until calcium chlorite precipitates and separating the precipitated calcium chlorite from the slurry before precipitation of calcium chlorate or sodium chlorate begins.

4. In the manufacture of calcium chlorite, the improvement which comprises absorbing chlorine dioxide in an aqueous slurry of calcium hydroxide containing calcium chlorate in proportion less than sufficient to saturate the slurry until calcium chlorite precipitates and separating the precipitated calcium chlorite from the slurry before precipitation of calcium chlorate begins, and cyclically utilizing part but not all of the calcium chlorate content of the slurry from which calcium chlorite is separated to form additional quantities of slurry for absorbing chlorine dioxide as first recited.

5. In the manufacture of calcium chlorite, the improvement which comprises absorbing chlorine dioxide in an aqueous slurry of calcium hydroxide containing calcium chlorate in proportion less than sufficient to saturate the slurry until calcium chlorite precipitates and separating the precipitated calcium chlorite from the slurry before precipitation of calcium chlorate begins, diluting and adding calcium hydroxide to part of the slurry from which calcium chlorite is separated to form additional quantities of slurry for absorbing chlorine dioxide as first recited and relieving the operation of another part of this slurry.

6. In the manufacture of calcium chlorite, the improvement which comprises absorbing chlorine dioxide in an aqueous slurry of calcium hydroxide containing calcium chlorate in proportion less than sufficient to saturate the slurry until calcium chlorite precipitates and separating the precipitated calcium chlorite from the slurry before precipitation of calcium chlorate begins, precipitating calcium chlorate from the slurry from which calcium chlorite is separated by concentration, separating the precipitated calcium chlorate from the concentrated slurry and diluting and adding calcium hydroxide to the concentrated slurry to form additional quantities of slurry for absorbing chlorine dioxide as first recited.

GEORGE PAUL VINCENT.